Apr. 10, 1923.

J. R. GRUETTER 1,451,216

DISCHARGE MECHANISM

Filed Apr. 6, 1922

INVENTOR.
John R. Gruetter
BY Gray and Lilly
ATTORNEYS.

Apr. 10, 1923.
J. R. GRUETTER
1,451,216
DISCHARGE MECHANISM.
Filed Apr. 6, 1922
5 sheets-sheet 5
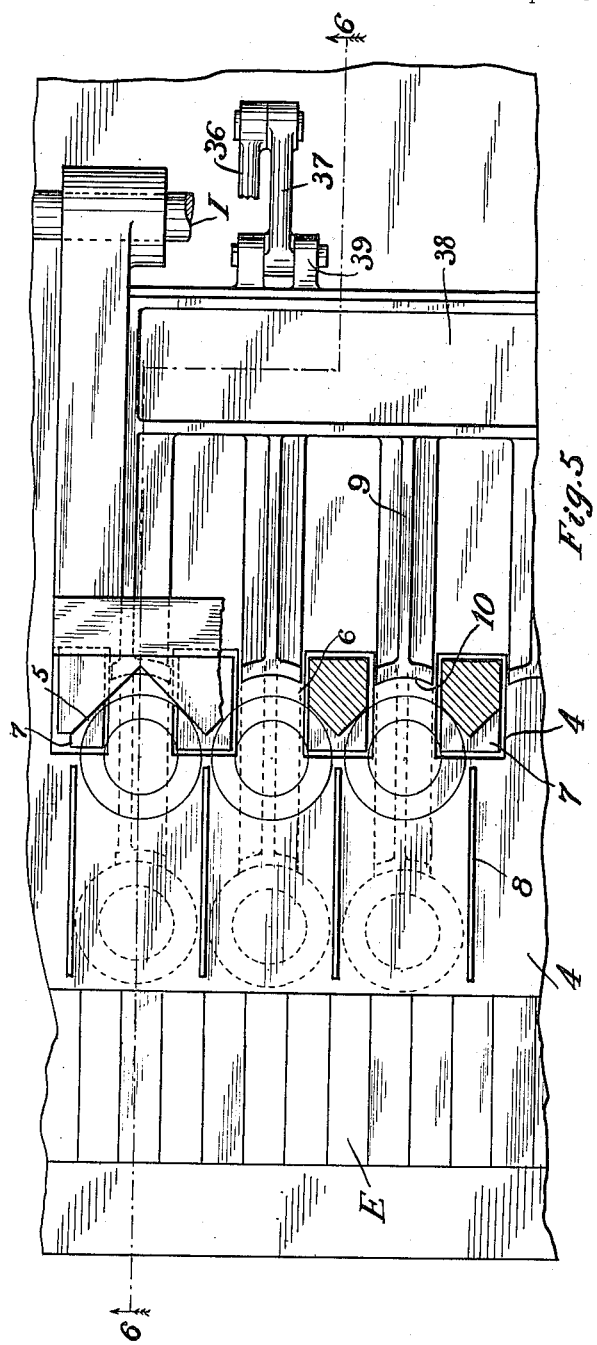
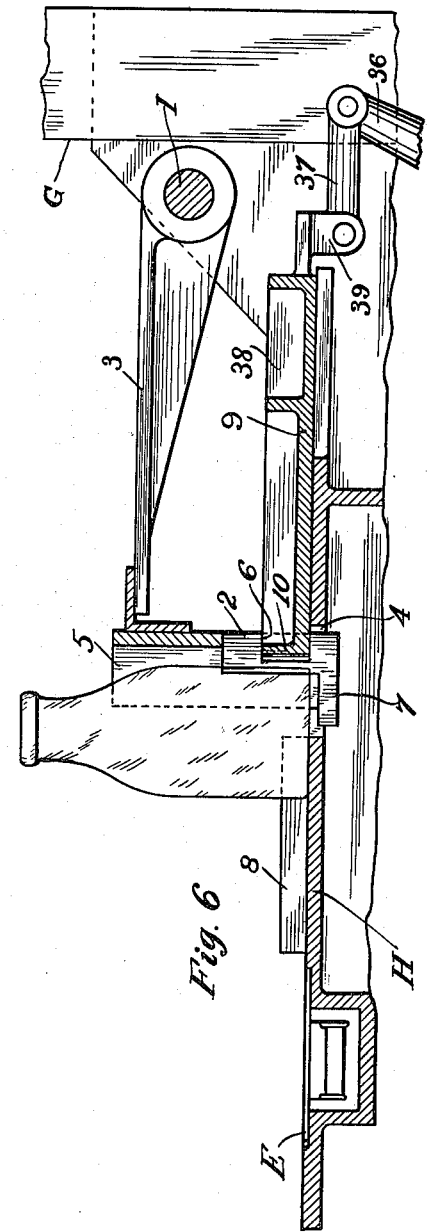
INVENTOR.
John R. Gruetter
BY Gray and Lilly
ATTORNEYS.

Patented Apr. 10, 1923.

1,451,216

UNITED STATES PATENT OFFICE.

JOHN R. GRUETTER, OF CLEVELAND, OHIO.

DISCHARGE MECHANISM.

Application filed April 6, 1922. Serial No. 550,074.

*To all whom it may concern:*

Be it known that I, JOHN R. GRUETTER, residing at Cleveland, in the county of Cuyahoga and State of Ohio, and a citizen of the United States, have invented certain new and useful Improvements in Discharge Mechanism, of which the following is a specification.

This invention relates to improvements in discharge mechanism for bottles, the same being disclosed as embodied in a mechanism for cleansing bottles while carried on an endless conveyor, delivering the bottles from said carrier to another conveyor which travels at right angles to the plane of the first and delivers the same to the point desired.

One object of the invention is to provide a discharge mechanism which shall be positively actuated, the bottle being directly moved by some element of the discharge at every step of its progress. It has been found to be a decided advantage in mechanism of this type to keep the bottles under direct control throughout the cycle of their movement. A release of the bottle from such direct actuation, such as a loose sliding movement of the bottles down a chute, admits of escape of the article from positive control which leads to undue breakage and waste which it is the function of my mechanism to eliminate.

Another object of the invention is to provide discharge mechanism for bottles that will transfer the latter in an upright position from the bottle holders of a traveling carrier to the traveling conveyor designed to receive them.

These and other objects I attain in the following manner, reference being had to the accompanying drawings, in which:

Figure 2 is a view from the side opposite to that from which Figure 1 is taken;

Figure 5 is a plan view of parts of the mechanism, on an enlarged scale, some parts being shown in horizontal section; and Figure 6 is a vertical section taken on the line 6—6 of Figure 5.

Figure 1:
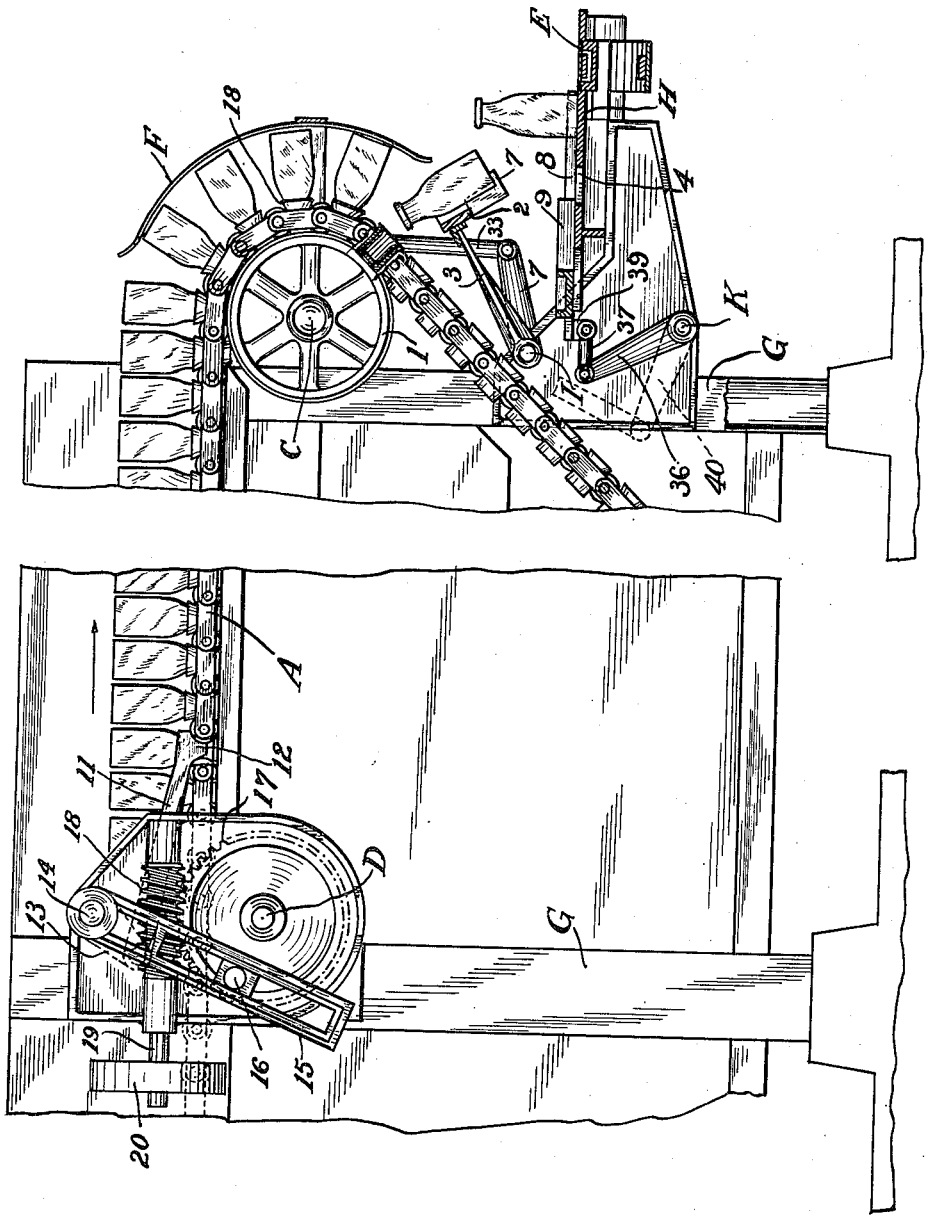
Figure 1 is a side view of the discharge mechanism together with a carrier actuating means, parts being shown in section.

In the drawings, G indicates a suitable frame for supporting the machine, only so much of the same being shown in this specification as may be essential to disclose the relation of the discharge to the actuating mechanism therefor. A designates a conventional carrier for bottles, including bottle holders or chucks B which receive the bottle necks therein and so maintain them by gravity on the upper run of the carrier, but permit their release at the discharge point of the machine. This carrier is often used as an instrument for moving bottles during a cleansing operation, but it is by no means to be understood that my discharge mechanism is limited to such use as my invention is designed for all sorts of machines which have a carrier from which bottles are to be discharged, especially the type in which they are to be transferred to another conveyor.

As embodied in the machine illustrated, C designates a conveyor pulley shaft, D a shaft for actuating mechanism, and E the conveyor for receiving the bottles from the transfer mechanism and conveying to another point which may be another machine, as a filling machine. The bottles are shown traveling in the direction indicated by the arrow, and finally arriving at the discharge end where gravity tends to release them; and a stationary guard F is provided to prevent their premature discharge. Two shafts I and K are arranged below C for a purpose to be later explained; and a supporting surface H is arranged parallel and adjacent to the conveyor E. The latter is arranged in a plane at right angles to that of the carrier A and is mounted on pulleys L for intermittent movement.

Figure 3:
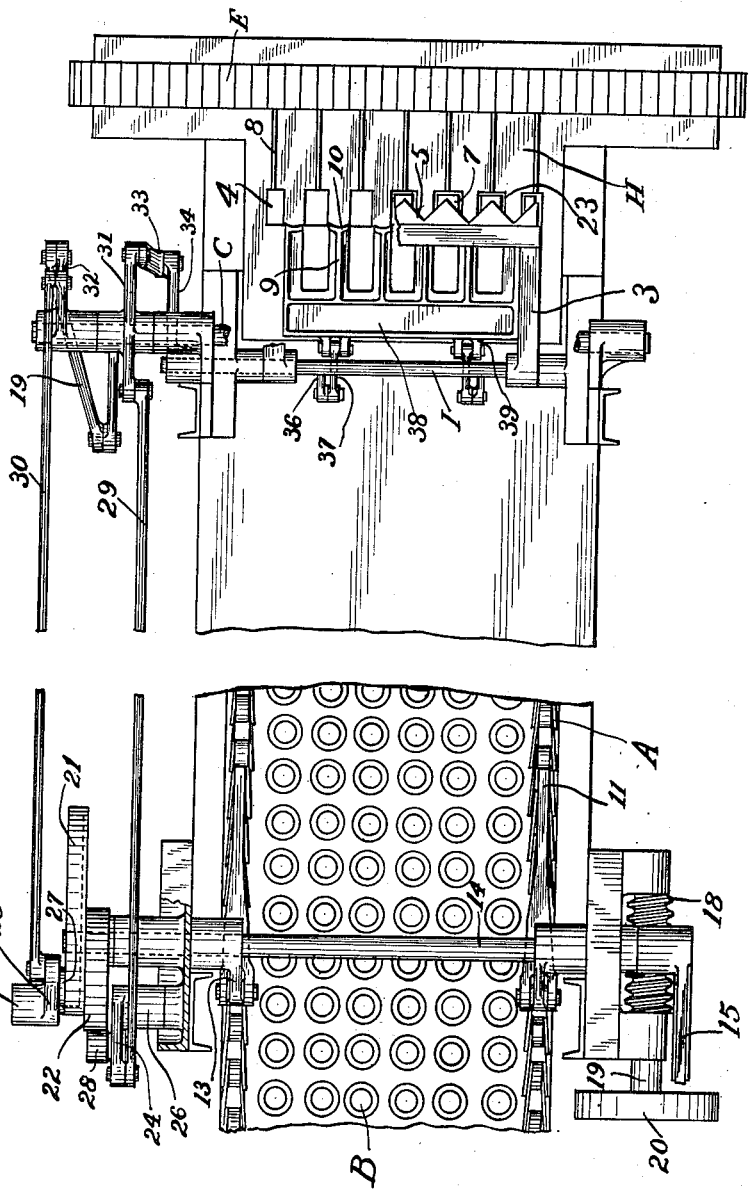
Figure 3 is a plan view, parts being broken away.
Figure 4:
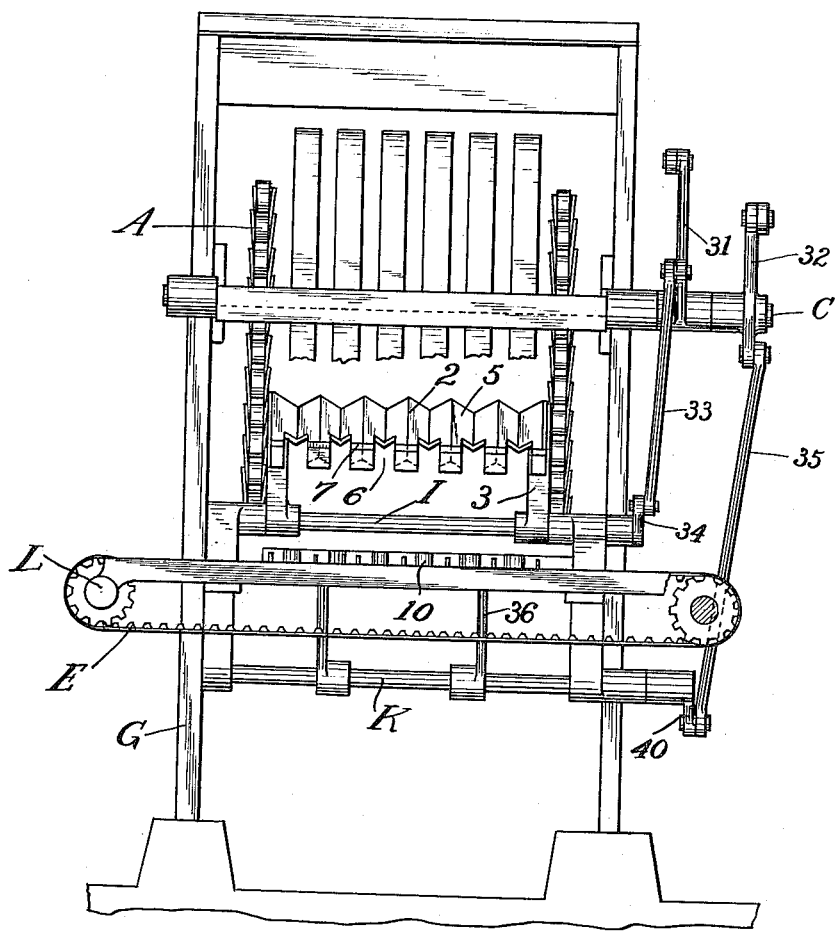
Figure 4 is an end view of the machine taken from the front.

As the chain carrier with bottles thereon rides over the conveyor pulley 1, the guard F restrains the bottles from falling from the holders or chucks B until they pass below the lower end of the guard, when they readily drop into the holders 2 which are positioned to receive them without their moving farther than to merely slip off the guard into the holders. It is to be understood that the said holders B are arranged in rows or banks as shown in Figures 3 to 5, these rows extending transversely of the carrier A while the bottles are traveling thereon; and the holders 2 built in a row and mounted on arms 3 actuated by the oscillating shaft I. Each swing of the arms 3 transfers a row of bottles from their holders B on the carrier to the stationary support H. The latter is provided with a row of openings 4 or seats therein to receive the bottoms of the holders 2 below the surface of the support, so that in the lowered position of the said holders the bottles are deposited on the support H, since the apertures 4 are not of a size adequate to receive the bottles which are larger than the outline of the openings 4 or holders 2.

The general shape of the latter is shown in Figure 6, where a holder is seen to be trough-shaped, the sides 5 of each holder or tray 2 forming a V in cross-section through the upper part of its structure, but having an opening 6 cut out of the lower part of its trough at the apex of the angle, as shown in such view, for a purpose to be later described. Each holder 2 of a row or series has this opening 6 and the sides of the opening have toes or stops 7 for supporting the base of the bottle, as shown particularly in Figures 3 to 6.

As each bottle rests on two spaced toes or stops 7, and the latter enter the openings 4 when the holder descends, it is evident that each bottle is deposited on the support H over two of said openings, as shown in Figs. 3 and 5. In these views it will be seen that stops for adjacent holders are integral, so that the number of stops 7 and openings 4 is only one more than that of the bottles to be actuated.

Figure 2:
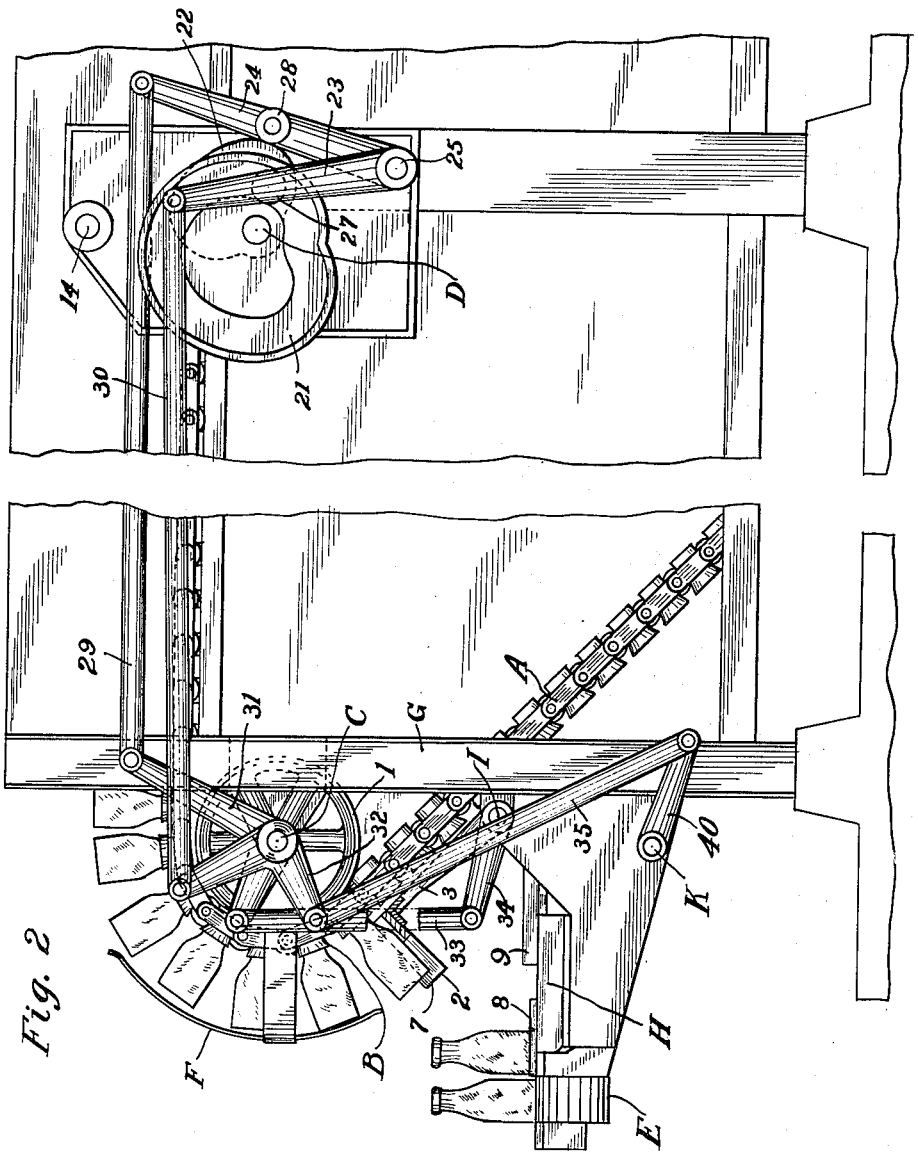

The support H extends along the side of the conveyor E for a distance at least equal to the length of a row of bottles that the holders 2 are designed to carry as a unit, and is divided transversely by vertical guide flanges 8 separating the bottles of a row. While the conveyor E is at rest and the holders are at their lowest position, a series of push rods or thrust members 9 are simultaneously inserted through the openings 6 and so push the row of bottles from their position on the support H, as seen in Figure 6, out of their seats in the holders 2 to a position adjacent the conveyor E, as shown in Figures 1 and 2; and in dotted lines in Figure 5. The holders or trays are now free to rise unobstructed by the bottles just deposited on the support, to the uppermost position to receive another row of bottles.

A row of bottles of, say, 6 or 12, having been placed alongside the conveyor E, and the next row deposited behind the first on the support, the next thrust of the rods 9 will push the first row onto the conveyor. Figure 2 shows one row upon the conveyor while the following row is seen adjacent the conveyor ready for the next cycle of movements. For the purpose of rendering the thrust movements of the rods 9 most effective, their outer ends are made curved or trough-shaped, as designated by numeral 10.

The travel of the carrier A is operated intermittently by a pair of rods 11 having toes 12 at their outer ends which drop down between the links of the carrier chains and push the latter forward the length of one link at each stroke, its contour being such that the toe easily rides over the link pivots slipping back in position to grasp another link. The said rods are actuated by arms 13 extending from an oscillating shaft 14, the latter being in turn actuated by an arm 15 driven by a pin 16 on a pulley fixed to the shaft D. The latter is actuated by a gear 17 mounted on said shaft which gear is driven by a worm 18 on a shaft 19 which is actuated by a belt pulley 20 or gear as may be found most expedient.

The shaft D has also mounted thereon two cams 21 and 22 which drive levers 23 and 24 pivoted on alined fulcrums 25 and 26, by rollers 27 and 28, respectively. Through the intermediacy of links 29 and 30 the levers 24 and 23 actuate the bell crank levers 31 and 32 respectively, the former serving to rock the shaft D by the link 33 and arm 34, and the latter the shaft K by means of link 35 and arm 40. The rocking of the shaft K reciprocates the rods 9 by means of the arms 36 and the links 37. When bottles are transferred in rows, as here shown, the rods 9 for pushing the several bottles of a row are fixed to a common base member 38 having on one edge lugs 39 to which the links 37 are pivoted. The unitary element comprising the parts 9, 38 and 39 is reciprocated in a horizontal plane upon the support or table H toward and from the conveyor E.

From the above description of parts the operation of my improved mechanism will be evident. A résumé of the joint action of the various elements will, however, be recited in the interest of clearness: Both carriers operate intermittently, the impulse for forward movement of the conveyor E, in the direction shown by the arrow in Figure 4, beginning a little earlier than that for the carrier A. In Figure 1 of the drawings, the forward movement of the actuating rod 11 is about to begin, while the holders 2 have just received a row of bottles from the carrier chucks B and have begun the down movement to deposit the bottles on the table H, and the row previously thrust over to a position adjacent the conveyor E is in position to receive a further thrust to the right, as shown in said view, for loading the same on the said conveyor. The bottles loaded on said conveyor by the last cycle of operations have been carried by the latter out of view, and said conveyor is about to come to rest to receive the next row. In Figure 2, the holders 2 are just receiving a row of bottles, and the conveyor E has not yet carried its load out of view. In Figures 5 and 6, the holders 2 are in the lowest position and the pushers are about to advance, the same being shown in Figure 5 in advanced position in dotted lines.

As soon as the holders 2 reach the lowermost position with the parts 7 just below the upper surface of the table H, the groove in cam 21 begins to thrust roller 27 outward, and thereby advance the rods 9 forward from the full line to the dotted line position of Figure 5, after which the rods at once recede so that the holders 2 may immediately rise to the position shown in Figure 2. This completes the cycle.

It is thus seen that the sliding movement of the bottles on the support H is positively directed by the flanges 8, and that every stage of their travel is thus accurately controlled by my automatic mechanism here disclosed. While the operation here shown is for treating bottles in rows, it is to be understood that I contemplate using my invention for discharging bottles from carriers on which they are carried singly and not in groups, as well. The holder 2 may evidently operate upon a single bottle, in which case said holder would consist of one trough-shaped tray with a single slot 6 therethrough and a stop 7 on either side of the slot. But one sliding rod 9 would then be used moving in said slot, and but one bottle would be loaded on the conveyor at a time.

It is also expressly understood that I am not to be restricted to the means shown for actuating the carrier A, but that such general structure, which is not claimed per se, is to be taken as merely illustrative, as other intermittent actuation would likely serve the purpose equally as well. Nor do I desire to restrict myself to the exact type of carrier A and chuck B here shown. Any carrier that will hold the bottles inverted on its upper run and will release them when they arrive beyond the guard F or other restraining means may serve as the mechanism from which my discharge mechanism may operate.

No means for actuating the conveyor E is disclosed in this case, as such mechanism has become more or less conventional, and accordingly it is neither shown nor claimed per se.

Having described my invention, what I claim, and desire to secure by Letters Patent, is—

1. In a discharge mechanism for bottles, a support having a row of sockets therein, a swinging member comprising a series of trays arranged side by side, stops at the lower ends of the several trays for supporting the bottoms of bottles thereon, the said trays having slots therein just above the said stops, and the said sockets being of a depth sufficient to receive the stops but not the bottles, a composite transversely reciprocating thrust mechanism including a base member resting on the surface of said support and parallel with the row of sockets but transverse of the plane of said swinging member, lugs at one edge of said base member for attachment of actuating means thereto, and a series of thrust rods extending from the opposite edge of the base and registering with and movable through the slots in said trays when the latter are in the down position, means for actuating the swinging member when the rods are in their withdrawn position, and means connected with said lugs for actuating the thrust members when the trays are in the down position, substantially as set forth.

2. In a discharge mechanism for bottles, a support for bottles and having a row of sockets therein, a swinging member comprising a series of trays arranged in a row side by side and stops at the lower ends of the several trays for receiving the bottoms of bottles thereon, the said sockets being of a depth sufficient to receive the stops but not the bottles, and a composite transversely reciprocating thrust mechanism including an elongated base member resting on the surface of said support and parallel with the row of bottles and transverse of the plane of said swinging member, lugs at one edge of said base member for attachment of actuating means thereto, and a series of thrust members extending from the opposite edge of the base registering with said trays and movable past them when the trays are in the down position for pushing the bottles therefrom, means for actuating the swinging member when the said thrust members are in the withdrawn position, and means connecting with said lugs for actuating the thrust mechanism when the trays are in the down position, substantially as set forth.

3. In a discharge mechanism for bottles, the combination with two conveyor mechanisms movable intermittently in intersecting planes, of a support adjacent one of such conveyors and below one end of the other, an oscillating arm carrying at its outer end a series of trays having stops at their ends and slots therethrough just above the stops, said support having a series of sockets therein of sufficient depth to receive the stops therein but not the bottles, a series of thrust members reciprocating through the said slots to push the bottles from the trays toward the adjacent conveyor when the stops are seated in the sockets, means for actuating the said arm to move the trays to and from the said support, and means for actuating the thrust members when the trays are in the down position, substantially as set forth.

4. In a discharge mechanism for bottles, a swinging member comprising a series of trays arranged side by side and each having a stop at its lower end for holding a bottle thereon, a support adjacent said swinging member and having a row of sockets therein, the latter being of a depth sufficient to receive the stops but not the bottles, thrust mechanism for pushing the bottles from the trays when the latter are in the lower position, and means for actuating the swinging member, substantially as set forth.

5. In an unloader for bottles, an endless carrier including chucks for receiving therein the necks of bottles, a bottle conveyor mounted for travel in a plane at right angles to that of the said carrier, a horizontal support adjacent the said conveyor, a trough-shaped tray movable in an arc from a point adjacent one of the said chucks when the latter are inverted, to the surface of said support and having a stop member at its lower end and a slot therethrough just above the stop, there being an opening in said support for receiving the stop therein so that its upper surface will in the down position be lower than the upper surface of said support, a push rod movable transversely of said tray and conveyor and through the said slot, and means for actuating the rod forward and backward while the tray is in its lower position and for swinging the tray while the said rod is in its withdrawn position, substantially as set forth.

6. In an unloader for bottles, a bottle carrier mechanism, a bottle conveyor mounted for travel in a plane at an angle to that of said carrier, a support adjacent the said conveyor, a trough-shaped tray swinging from a point adjacent the said carrier to the surface of said support and having a stop member for receiving the bottom of a bottle thereon and a slot through the lower part thereof just above the stop, there being an opening in the said support for permitting the stop to sink therein and deposit the bottle on the surface of the said support, a reciprocating push rod movable through the slot in a direction transverse to the said conveyor, and means for actuating the tray and the push rod, substantially as set forth.

7. In a discharge mechanism for bottles, a support for receiving bottles thereon in an upright position and having a socket therein, a swinging tray having a stop at its lower end for holding a bottle thereon and a slot therein just above the stop, the said socket being of a depth sufficient to receive the stop but not the bottle, and a transversely reciprocating push rod movable through the said slot when the tray is in the down position, and means for actuating the tray when the said rod is in its withdrawn position, substantially as set forth.

8. In a discharge mechanism for bottles, the combination of a bottle receiving member having a stop at its bottom on which a bottle may rest, a support having a horizontal surface for receiving bottles and a socket therein of sufficient depth to receive the stop therein but not a bottle, mechanism for expelling bottle from the receiving member when the stop rests within the socket, and means for moving the receiving member upwardly while the expelling mechanism is withdrawn, substantially as set forth.

9. In a discharge mechanism for bottles, a swinging member comprising a trough-shaped tray having a stop at its lower end for holding a bottle thereon, a support adjacent said swinging member and having a socket therein of sufficient depth to receive the stop therein but not the bottle, thrust mechanism for pushing a bottle from the tray when the latter is in the down position, and means for actuating the swinging member, substantially as set forth.

10. In a discharge mechanism for bottles, the combination of a bottle holder having a stop at one end for receiving the bottom of a bottle thereon, a support having a socket therein of sufficient depth to receive therein the stop but not the bottle, means for reciprocating the said holder upwardly and downwardly, the latter movement terminating at the bottom of the socket, and means for expelling the bottle from the holder when the stop is in its lowest position, substantially as set forth.

11. In a discharge mechanism for bottles, the combination of a bottle holder having means for supporting a bottle therein in an upright position, a support having a socket therein of sufficient depth to receive therein the bottom of the holder but not the bottle, and means for swinging the holder toward and from the bottom of said socket, substantially as set forth.

12. In a discharge mechanism for bottles, a trough-shaped tray comprising side members whose edges meet to form a V in cross section, and having a slot therethrough at an angle to its axis and adjacent its bottom, and stop members adjacent the bottom of the tray and on either side of the slot for supporting the bottom of a bottle thereon, substantially as set forth.

13. In a discharge mechanism for bottles, a tray comprising a trough-shaped member having a slot therethrough adjacent one of its ends and stop members on either side of the slot for supporting the bottom of a bottle resting in the trough, in combination with a reciprocating expulsion member movable through said slot above the stops, substantially as set forth.

14. In a discharge mechanism for bottles, the combination of a support having a socket in its upper surface smaller in cross section than the bottom of a bottle, and means including a portion small enough to enter said socket, for depositing a bottle on said support and over the socket, substantially as set forth.

15. In a discharge mechanism for bottles, the combination of a bottle holder having a stop at one end for receiving the bottom of a bottle thereon, a support having a depression therein of sufficient size to receive therein the stop but not the bottle, means for moving the holder toward and from the depression, the former movement terminating at the bottom of the depression, and means for expelling the bottle from the holder when the stop is in its lowest position, substantially as set forth.

16. In a discharge mechanism for bottles, the combination of a support having an opening in its upper surface smaller in cross section than the bottom of a bottle, and means including a portion small enough to enter said opening, for depositing a bottle on said support and over the opening, substantially as set forth.

17. In a discharge mechanism for bottles, the combination of a bottle holder having a stop at one end for receiving the bottom of a bottle thereon, a support having an opening therein of sufficient size to receive therein the stop but not the bottle, means for moving the holder toward and from the opening, the former movement terminating beneath the surface of said support, and means for expelling the bottle from the holder when the stop is in its lowest position, substantially as set forth.

18. In a discharge mechanism for bottles, the combination of a support having a series of sockets in its upper surface each smaller in cross section than the bottom of a bottle, and means including portions each small enough to enter one of said sockets, for depositing a bottle on said support and over a plurality of said sockets, substantially as set forth.

19. In a discharge mechanism for bottles, the combination of a bottle holder having spaced stops at one end for receiving the bottom of a bottle thereon, a support having openings therein so positioned and each of sufficient size to receive therein a stop but not the bottle, means for moving the holder toward and from the openings, the former movement terminating beneath the surface of said support, and means movable between the stops for expelling the bottle from the holder when the stops are in their lowest position, substantially as set forth.

20. In a discharge mechanism for bottles, a swinging bottle-carrying member comprising a series of trays arranged in a row side by side, and a pair of spaced stops at the lower end of each tray for receiving the bottom of a bottle thereon, there being slots through the several trays between and just above the stops of each pair, substantially as set forth.

21. In a discharge mechanism for bottles, a swinging bottle-carrying member comprising a plurality of trough-shaped trays arranged in a row side by side, each tray comprising side members whose edges meet to form a V in cross section, and having a slot therethrough at an angle to its axis and adjacent its bottom, and spaced stop members adjacent the bottom of the tray and on either side of the slot for supporting the bottom of a bottle thereon, each stop of one tray being integral with a stop of an adjacent tray, substantially as set forth.

In testimony whereof I hereunto affix my signature.

JOHN R. GRUETTER.